(12) United States Patent
Itou (10) Patent No.: US 6,559,564 B1
(45) Date of Patent: May 6, 2003

(54) BICYCLE HUB WITH GENERATOR AND ANTILOCK FUNCTIONS

(75) Inventor: Minoru Itou, Toyoura-gun (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/722,094

(22) Filed: Nov. 22, 2000

(30) Foreign Application Priority Data

Jan. 31, 2000 (JP) ........................................ 2000-021609

(51) Int. Cl.⁷ ................................................ B60B 27/00
(52) U.S. Cl. ..................... 310/67 A; 310/93; 188/24.17; 188/24.14
(58) Field of Search ............................... 310/67 A, 75 C, 310/257, 77, 93; 188/24.17, 24.11, 24.14, 26

(56) References Cited

U.S. PATENT DOCUMENTS

| | | | | |
|---|---|---|---|---|
| 2,430,705 A | * | 11/1947 | Brown ..................... | 310/67 A |
| 5,421,435 A | | 6/1995 | Hanada .................... | 188/24.14 |
| 5,535,855 A | | 7/1996 | Hanada .................... | 188/24.14 |

FOREIGN PATENT DOCUMENTS

| | | | | |
|---|---|---|---|---|
| EP | 982834 A1 | | 3/2000 | ............ H02K/1/14 |
| JP | 10-1081 | * | 1/1998 | ................ 310/67 A |
| JP | 20001-213104 | * | 8/2001 | ................ 310/67 A |

* cited by examiner

Primary Examiner—Karl Tamai
(74) Attorney, Agent, or Firm—James A. Deland (57) ABSTRACT

A bicycle hub includes a hub axle and a hub shell including a first tubular member having a first hub flange secured thereto and a separate second tubular member having a second hub flange secured thereto. Bearings are disposed between the hub shell and the hub axle for rotatably supporting the first tubular member and the second tubular member relative to the hub axle. A generator mechanism is housed in the first tubular member and adapted to generate electricity by rotation of the first tubular member relative to the hub axle, and a brake force adjusting mechanism is housed in the second tubular member and adapted to limit a maximum damping force of a brake.

26 Claims, 7 Drawing Sheets

BICYCLE HUB WITH GENERATOR AND ANTILOCK FUNCTIONS

BACKGROUND OF THE INVENTION

The present invention is directed to wheel hubs for bicycles and, more particularly, to a wheel hub that is capable of housing both a generator mechanism and a brake force adjusting mechanism.

A conventional bicycle hub comprises a hub axle detachably and nonrotatably mounted in a bicycle fork (frame), a tubular hub shell (outer shell) rotatably mounted on the hub axle, and bearings for rotatably supporting the hub shell on the hub axle. A pair of external hub flanges are formed at the two ends of the hub shell to allow wheel spokes to be attached to the hub shell.

It is known to provide generator mechanisms inside such hub shells to convert rotational power of the hub shell into electrical power for illumination purposes. Incorporating such generator mechanisms into the hub shell provides higher generation efficiency and reduces wheel rotation loss in comparison with generators that contact the wheel rim to convert rotational power of the wheel rim into electrical power. It is also known to mount a brake to the hub for restricting the rotation of the hub shell relative to the hub axle. In some such systems the interior of the hub shell may accommodate an anti-lock brake mechanism (brake force adjusting mechanism) capable of adjusting the damping force of the brake. The brake force adjusting mechanism may use a clutch so that, when considerable brake damping force is applied, the clutch is caused to slip to prevent excessive damping force from being exerted on the wheel. Wheel locking thus can be prevented by adjusting the brake force adjusting mechanism to accommodate the characteristics of the bicycle.

In known systems, the hub shell contains either a generator mechanism or a brake force adjusting mechanism, but not both. It would be convenient to combine such power generating and brake force adjusting functions in a single bicycle wheel. However, attempts to endow a single wheel with both these functions result in the use of two bicycle hubs, each provided with one of the aforementioned functions and configured such that a pair of left and right hub flanges provided at the two ends of the hub shell are attached to wheel spokes in the manner described above. For this reason, adopting one of the hubs as the bicycle hub makes it impossible to attach the other bicycle hub and leaves no choice but to select either the generating function or the brake force adjusting function.

Another convenient feature would be a bicycle frame with a brake for restricting the relative rotation of the hub shell and the hub axle of a bicycle hub when this hub shell contains a generator mechanism. A structure in which the hub shell and the structural members constituting the brake are directly or indirectly connected together is commonly adopted for brake mounting, and meshing mechanisms are often adopted for such connection. When a meshing mechanism is adopted in this manner, appropriate materials and hardening treatments must be selected for the entire hub shell, thus resulting in higher manufacturing costs.

SUMMARY OF THE INVENTION

The present invention is directed to a bicycle hub wherein both a generator mechanism and a brake force adjusting mechanism are disposed within the hub shell. The present invention also is directed to a bicycle hub that accommodates both a generator mechanism and an optional brake mechanism.

In one embodiment of the present invention directed to a bicycle hub wherein both a generator mechanism and a brake force adjusting mechanism are disposed within the hub shell, a bicycle hub includes a hub axle and a hub shell including a first tubular member having a first hub flange secured thereto and a separate second tubular member having a second hub flange secured thereto. Bearings are disposed between the hub shell and the hub axle for rotatably supporting the first tubular member and the second tubular member relative to the hub axle. A generator mechanism is housed in the first tubular member and adapted to generate electricity by rotation of the first tubular member relative to the hub axle, and a brake force adjusting mechanism is housed in the second tubular member and adapted to limit a maximum damping force of a brake. In a more specific embodiment, the generator mechanism includes an inside stator retained to the hub axle and an outside rotor that rotates in response to rotation of the first tubular member. Furthermore, the brake force adjusting mechanism includes a brake force receiving member rotatably mounted relative to the hub axle for receiving a braking force from a brake mechanism and a frictional coupler for forming a frictional link between the second tubular member and the brake force receiving member. If desired, the frictional coupler may include a first frictional member nonrotatably coupled relative to the brake force receiving member, a second frictional member nonrotatably coupled relative to the second tubular member in a facing arrangement with the first frictional member, and a biasing mechanism for biasing the first frictional member and the second frictional member toward each other.

In an embodiment of the invention that accommodates both a generator mechanism and an optional brake mechanism, a bicycle hub includes a hub axle and a hub shell including a first tubular member having a first hub flange secured thereto, a separate second tubular member having a second hub flange secured thereto, and a brake coupling member for coupling the second tubular member to a brake device. In this embodiment, the second tubular member is harder than the first tubular member. Bearings are disposed between the hub shell and the hub axle for rotatably supporting the first tubular member and the second tubular member relative to the hub axle, and a generator mechanism is housed in the first tubular member and is adapted to generate electricity by rotation of the first tubular member relative to the hub axle. If desired, a brake force adjusting mechanism adapted to limit a maximum damping force of a brake may be housed in the second tubular member. The structure of the generator mechanism or brake force adjusting mechanism may be similar to the corresponding mechanisms noted above, or they may be different depending upon the application.

DETAILED DESCRIPTION OF THE EMBODIMENTS

Figure 1:
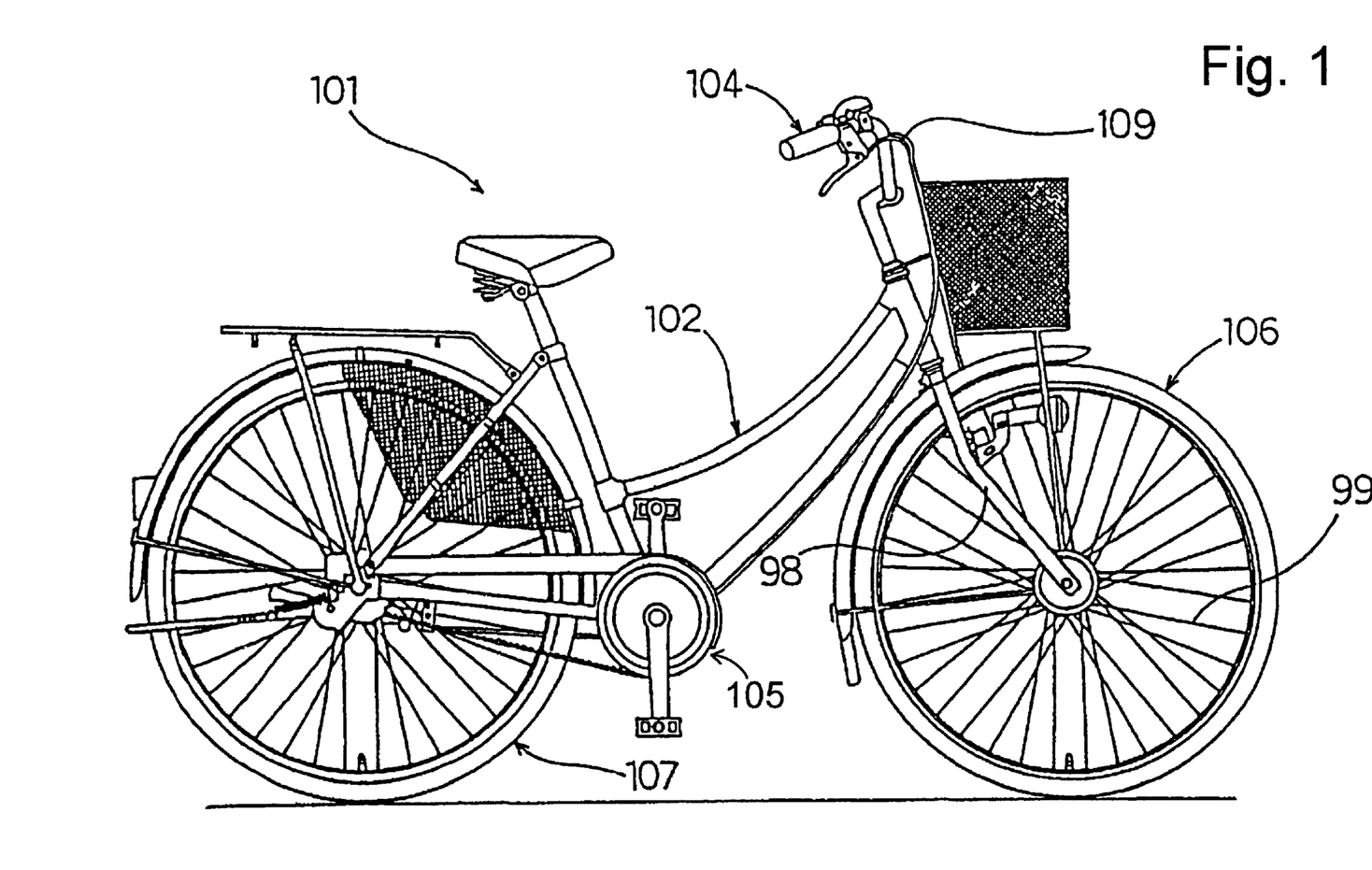
FIG. 1 is a side view of a bicycle that incorporates a particular embodiment of a bicycle hub according to the present invention.
Figure 2:
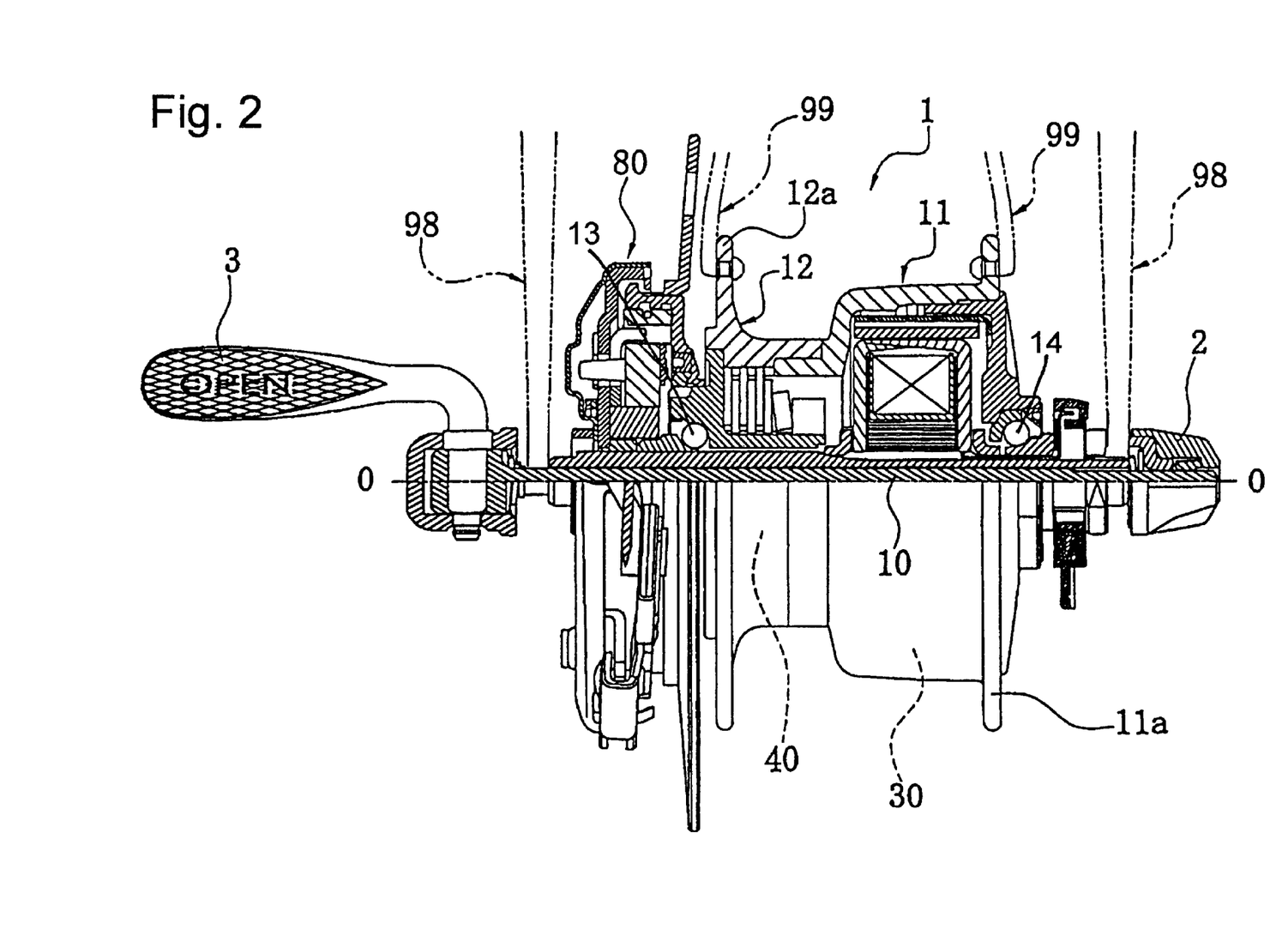
FIG. 2 is a partial cross sectional rear view of a particular embodiment of a bicycle hub and roller brake according to the present invention.

FIG. 1 is a side view of a bicycle 101 that incorporates a particular embodiment of a front bicycle hub 1 according to the present invention. The bicycle 101 comprises a frame 102 including a front wheel fork 98, a handle 104, a drive unit 105 (composed of a chain, pedals, and the like), a front wheel 106 having spokes 99, and a rear wheel 107. As shown in FIGS. 1 and 2, the front hub 1 is attached to the front wheel fork 98 and to the front wheel 106 of the bicycle 101. More specifically, the front hub 1 is fixed to the front wheel fork 98 on the right and left sides of a hub axle 10, and spokes 99 are fixed to two hub flanges 11a and 12a. The two ends of the hub axle 10 are fixed by adjustment nuts 2 or cam levers 3 to the end portions of the front wheel fork 98. The axis O-O shown is the axis of rotation of the front wheel 106 of the bicycle.

Figure 3:
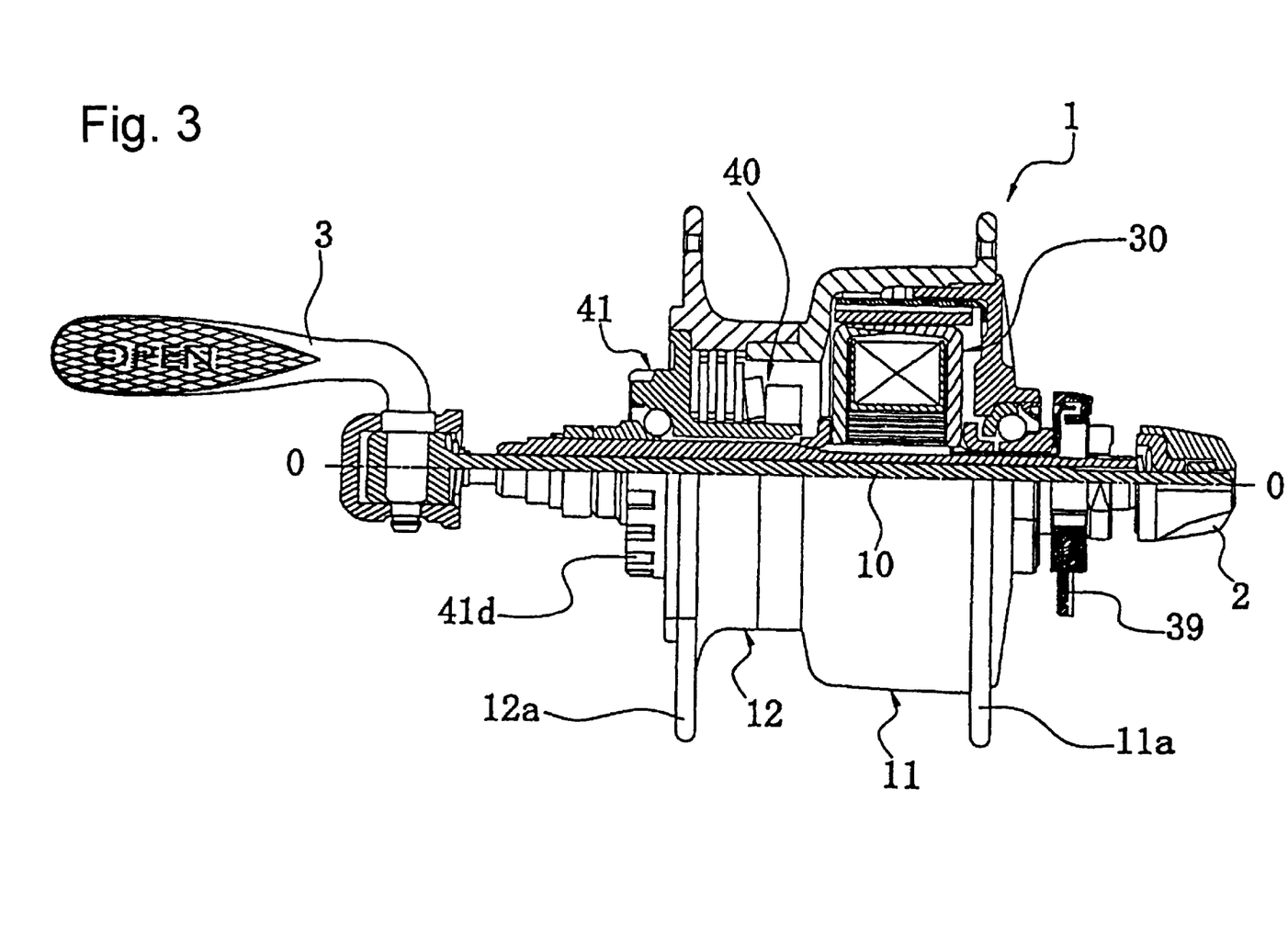
FIG. 3 is a partial cross sectional view of the bicycle hub shown in FIG. 2.
Figure 4:
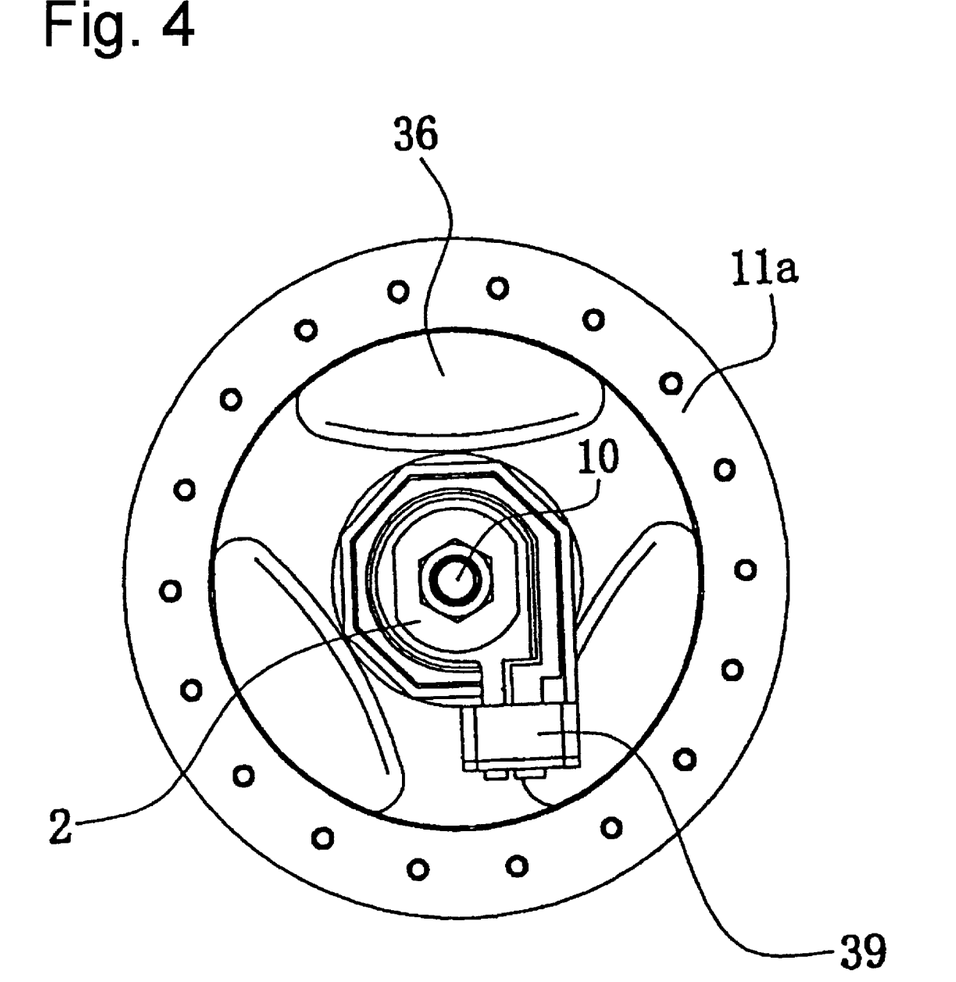
FIG. 4 is a right side view of the bicycle hub shown in FIG. 3.

The front hub 1 comprises the hub axle 10, a first tubular member 11, a second tubular member 12, two bearings 13 and 14, a dynamo (generator mechanism) 30, and a brake modulator (brake force adjusting mechanism) 40. A roller brake 80 is coupled to the left side of second tubular member 12 for applying a braking force to first tubular member 11 and second tubular member 12. Dynamo 30 allows generated power to be fed to the headlight, taillight, and the like. Brake modulator 40 absorbs excessive braking force (rotation damping force) produced by the roller brake 80, thereby performing an anti-lock function for front wheel 106. Power generated by the dynamo 30 can be drawn from a connector 39 shown in FIGS. 3 and 4.

Figure 5:
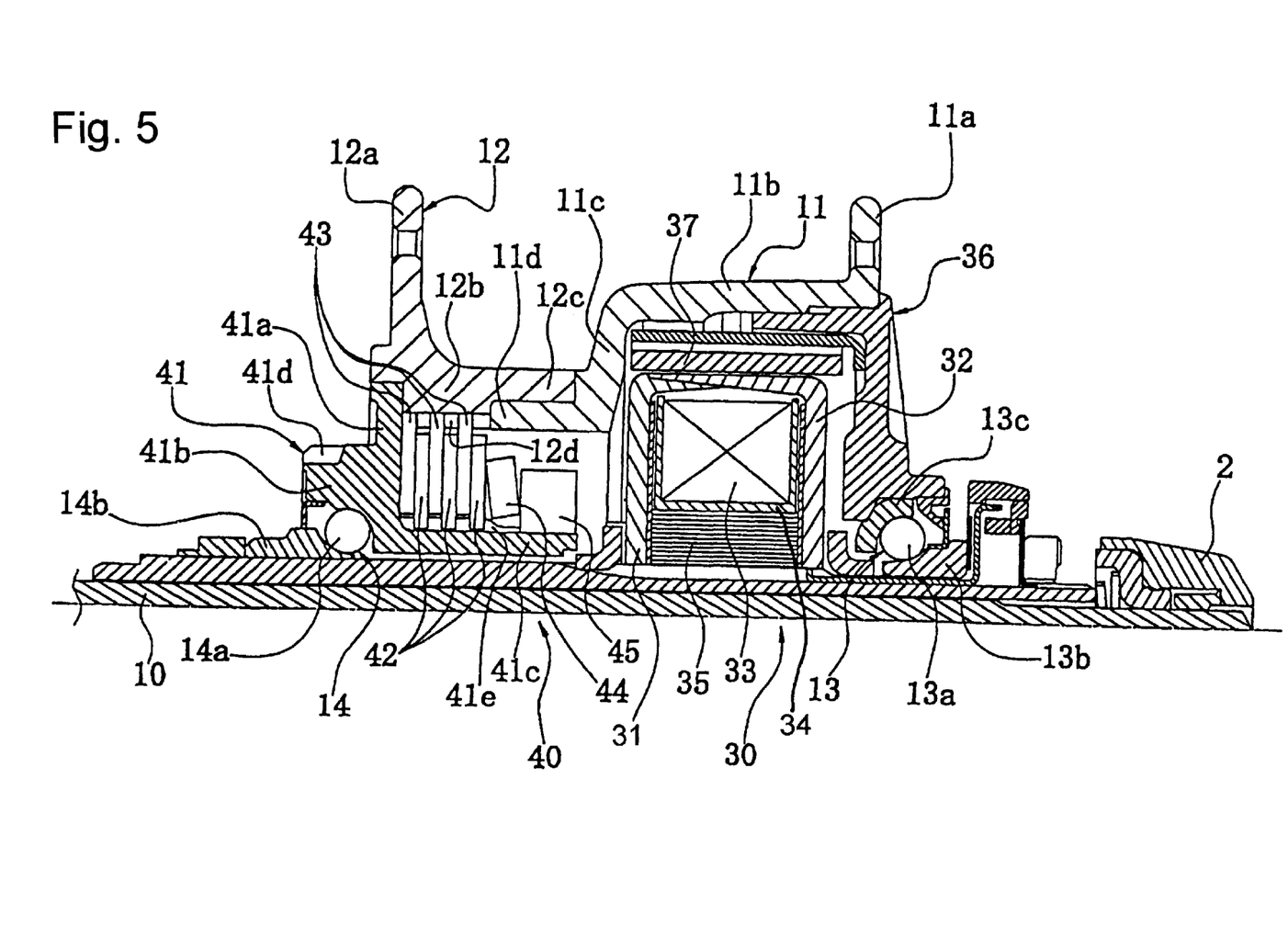
FIG. 5 is a fragmentary expanded cross sectional view of the bicycle hub shown in FIG. 3.

The first tubular member 11 serves as an enclosure for the dynamo 30. In this embodiment, first tubular member 11 is formed from aluminum alloy die cast Type 5 (ADC5). As shown more specifically in FIG. 5, first tubular member 11 comprises a first annular hub flange 11a, a first cylindrical component 11b, an annular sloping component 11c, and a mating tubular component 11d. First hub flange 11a is provided with a plurality of openings that correspond to the diameter of the spokes 99, and the openings are arranged at regular intervals in the circumferential direction. As shown in FIG. 2, the spokes 99 are fixed in these openings such that the inner ends of the spokes are disposed on the right. As shown in FIG. 5, the first cylindrical component 11b is a cylindrical section extending from the internal peripheral end of the first hub flange 11a to the left side. A cap 36 of the dynamo 30 is mounted on the internal peripheral surface of the first cylindrical component 11b. The annular sloping component 11c extends radially inwardly from the left end of the first cylindrical component 11b, and the cylindrical mating tubular component 11d extends to the left from the inner peripheral end of the annular sloping component 11c.

The second tubular member 12 serves as an enclosure for the brake modulator 40. In this embodiment, second tubular member 12 is forged from an aluminum alloy, and it is heat-treated to a hardness of HRB 55 or greater. As a result, second tubular member 12 is made harder than the first tubular member 11. As shown in FIG. 5, second tubular member 12 comprises a second annular hub flange 12a, a second cylindrical component 12b extending to the right from the inner peripheral end of the second hub flange 12a, and a cylindrical mating tubular component 12c extending to the right of second cylindrical component 12b. The tubular members 11 and 12 are rendered nonrotatable relative to each other by causing the inner peripheral surface of the mating tubular component 12c to engage the outer peripheral surface of the mating tubular component 11d of the first tubular member 11. The outer peripheral portion of the second hub flange 12a is provided with a plurality of openings that correspond to the diameter of the spokes 99, wherein the openings are arranged at regular intervals in the circumferential direction. The spokes 99 are fixed in these openings such that the inner ends of the spokes are disposed on the left side as shown in FIG. 2.

Serrations or splines 12d for engaging a plurality of complementary splines on the hub-side friction plate 43 of the brake modulator 40 are provided to the inner peripheral surface of the second cylindrical component 12b. The diameter of the second cylindrical component 12b of the second tubular member 12 is less than the diameter of the first cylindrical component 11b of the first tubular member 11 because this arrangement is sufficient for accommodating the brake modulator 40. The first tubular member 11 and the second tubular member 12 constitute the outer shell of the front hub 1.

The bearing 13 comprises a plurality of balls 13a, a ball race 13b for supporting these balls 13a, and a cup 13c. The ball race 13b is fixed to the hub axle 10, and the cup 13c is fixed to the inner peripheral portion of the cap 36 of dynamo 30. The bearing 13 is configured such that the cap 36 of the dynamo 30 and the first tubular member 11 mounted on the cap 36 are rotatably supported on the hub axle 10. Similarly, the bearing 14 comprises a plurality of balls 14a, a ball race 14b for supporting these balls 14a, and an annular cup 41 of the brake modulator 40. The ball race 14b is fixed to the hub axle 10, and the bearing 14 rotatably supports the annular cup 41 and the second tubular member 12 on the hub axle 10.

The dynamo 30 comprises an inside stator and an outside rotor. The inside stator primarily comprises two stator yokes 31 and 32, a bobbin 34 with a wound coil 33, and a tubular core yoke 35 fixed to hub axle 10. When assembled together, the stator yokes 31 and 32, the bobbin 34, and the tubular core yoke 35 form a unified inside stator.

The stator yokes 31 and 32 consist of disk portions and claws. Fourteen claws are formed at regular intervals in the circumferential direction, and these claws extend along the O-O axis from the outer peripheral edges of the disk portions of the stator yokes 31 and 32. When assembled, the claws of the two stator yokes 31 and 32 are spaced at regular intervals and are aligned at regular intervals in the circumferential direction. Permanent magnets 37 are positioned facing each claw at radially external positions in relation to the claws. In addition, the disk portions of the stator yokes 31 and 32 have round holes for accommodating the hub axle 10, and slits extending radially outward from the round holes.

The bobbin 34 is an annular member made of resin. Grooves for winding and supporting the coil 33 are formed on the external peripheral portion thereof, and stepped notches for mating with the tubular core yoke 35 are formed in the internal peripheral portion thereof.

The tubular core yoke 35, composed of 12 split-piece assemblies stacked parallel to the direction of the O-O axis in this embodiment, is mounted on the inside of the bobbin 34 in engagement with the notches in the internal peripheral portion of the bobbin 34. Each of the split-piece assemblies constituting the tubular core yoke 35 is obtained by fitting together four separate pieces shaped as rectangular sheets. When the twelve split-piece assemblies are fitted into the notches in the internal peripheral portion of the bobbin 34, these split-piece assemblies form the tubular core yoke 35. This core yoke has an internal space that has a square cross section and allows the hub axle 10 to pass through the center thereof.

The outside rotor is formed by the aforementioned first tubular member 11 and cap 36, and the resulting assembly is rotatably supported on the hub axle 10 by the bearing 13. The cap 36 is provided with a permanent magnet 37 which is composed of four magnet pieces divided at regular intervals in the circumferential direction. The permanent magnet 37 is magnetized such that the N-poles and S-poles thereof are disposed alternately at regular intervals, and each of the resulting 28 poles lies opposite a claw of the stator yokes 31 and 32.

The brake modulator 40, which is a mechanism disposed inside the second cylindrical component 12b of the second tubular member 12, comprises the annular cup (brake-side member) 41, three brake-side friction plates (first frictional members) 42, three hub-side friction plates (second frictional members) 43, a conical spring washer 44, and a nut 45.

The annular cup 41 is formed from carbon steel that is carburized, quenched, and tempered, and it primarily comprises a circular disk component 41a, a left projection (ball race) 41b, and an inside tubular component 41c. The outer peripheral portion of the circular disk component 41a fits into the annular notch provided to the left inner peripheral end of the second tubular member 12. The left projection 41b is a cylindrical section extending from the circular disk component 41a to the left, and the outer peripheral portion at the end thereof is provided with an 18-tooth serrated portion 41d. The inside tubular component 41c is a tubular component extending to the right from the inner peripheral end of the circular disk component 41a, and the outer peripheral portion thereof is provided with three notches 41e.

The three brake-side friction plates 42 are washers with three inner peripheral projections that fit into the three notches 41e of the annular cup 41. These brake-side friction plates 42 are disposed between the three hub-side friction plates 43 and between the conical spring washer 44 and the hub-side friction plates 43 on the right side. The outer peripheral portions of the three hub-side friction plates 43 are provided with a plurality of teeth for engaging the serrations 12d on the inner peripheral portion of the second tubular member 12. These hub-side friction plates 43 are disposed between the three brake-side friction plates 42 and between the circular disk component 41a of the annular cup 41 and the left-most brake-side friction plates 42. The conical spring washer 44 urges the friction plates 42 and 43 toward the circular disk component 41a of the annular cup 41 in a state in which the right side thereof is pressed against the nut 45, the friction plates 42 and 43 are held between each other, and torque is transmitted through them. The nut 45 is fixed by being screwed onto the tip (right end) of the inside tubular component 41c of the annular cup 41.

Figure 6:
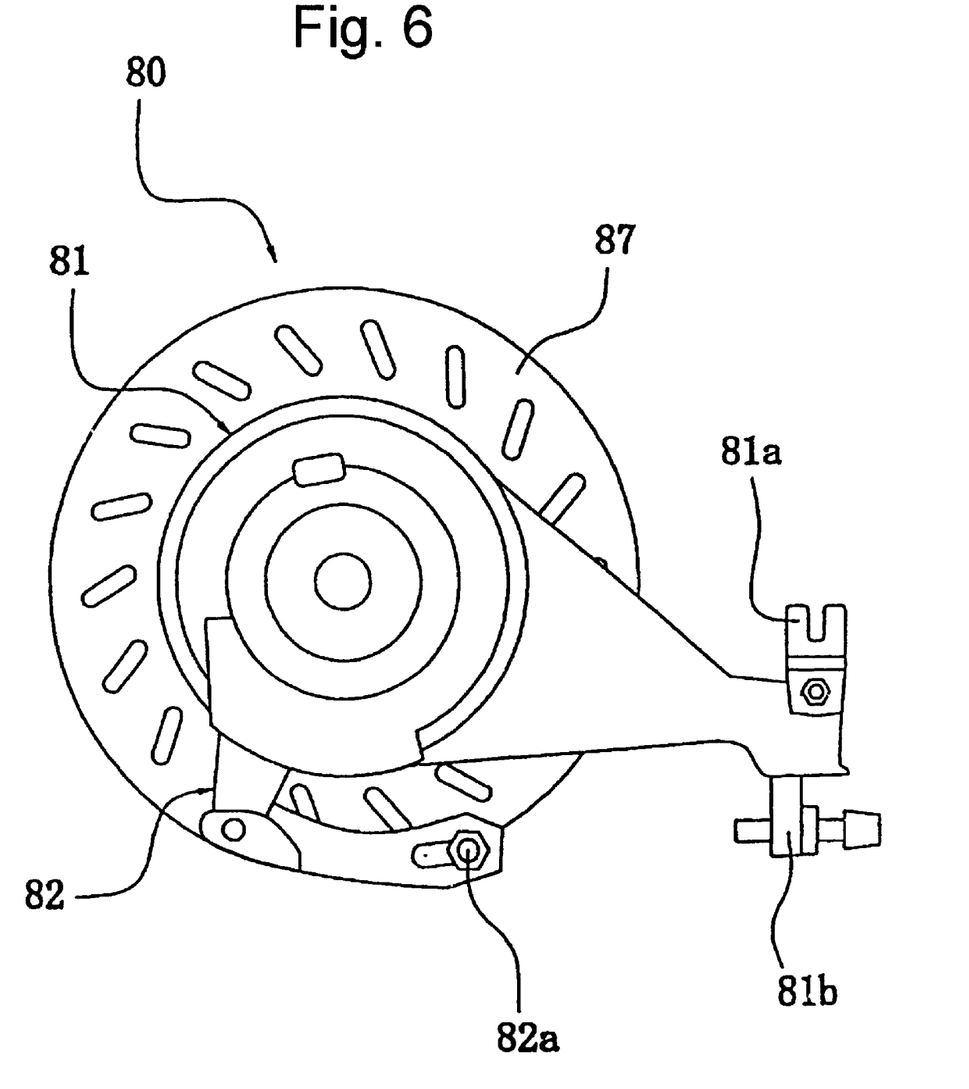
FIG. 6 is a left side view of the roller brake shown in FIG. 2.
Figure 7:
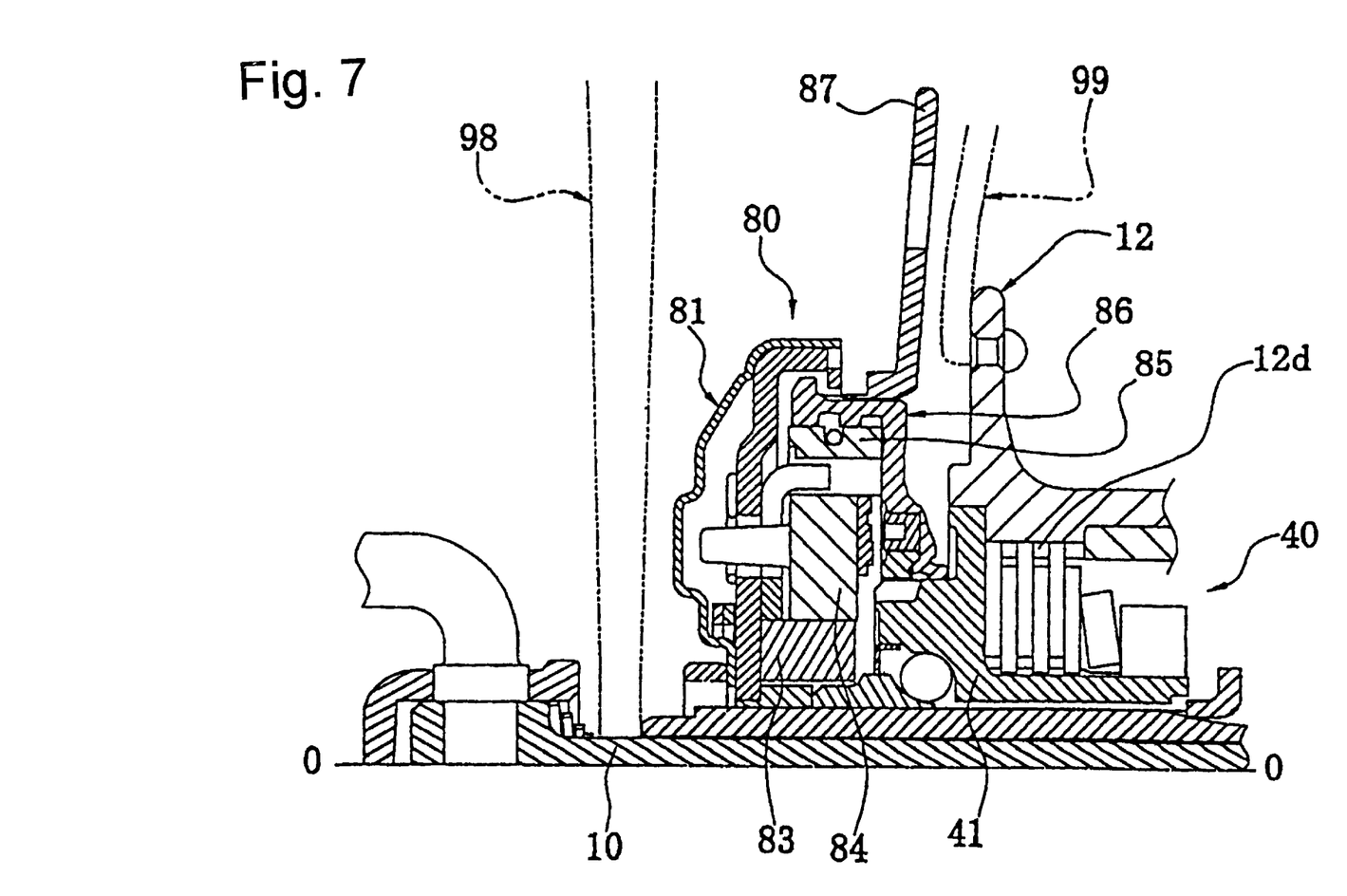
FIG. 7 is a fragmentary expanded cross sectional view of the roller brake and brake force adjusting mechanism shown in FIG. 2.

As shown in FIGS. 6 and 7, the roller brake 80 comprises a casing 81, a rocking member 82, an annular cam 83, a plurality of rollers 84, brake shoes 85, a brake drum 86, and a cooling fin 87. The roller brake 80 is set on the hub axle 10 such that the end portion of the brake drum 86 meshes with the serrated portion 41d of the annular cup 41 of the brake modulator 40, and the attachment component 81a of the casing 81 is fixed to the front wheel fork 98. During the setting of the roller brake 80, the outer cable of a brake wire 109 (see FIG. 1) is secured in the outer holder 81b of the casing 81, and the inner cable is connected to the connector 82a provided to the rocking member 82.

The rocking member 82 is pivotably supported relative to the casing 81 and pivots relative to the casing 81 when the inner cable of the brake wire 109 is pulled or released. The annular cam 83, which is connected to the rocking member 82, rotates through a prescribed angle in conformity with the pivoting of the rocking member 82. The rollers 84 are disposed at the outer peripheral surface of the annular cam 83, and they move radially in accordance with the rotation of the annular cam 83. On the other hand, the rollers 84 are housed in a roller case for suppressing any shifting in position in the circumferential direction.

A plurality of brake shoes 85 extend in the circumferential direction around the rollers 84, and these shoes are pushed radially outwardly or retracted inwardly in accordance with the radial movement of the rollers 84. The brake shoes 85 are prevented from rotating in the circumferential direction. The outer peripheral portion of brake drum 86 is disposed around the outside of the brake shoes 85, and the inner peripheral portion of brake drum 86 is provided with teeth for meshing with the serrated portion 41d of the annular cup 41 of the brake modulator 40. The brake drum 86 can rotate in relation to the casing 81.

The cooling fin 87 is a large annular fin in contact with the outer peripheral surface of the brake drum 86, steeply widening therefrom toward its outer periphery. The cooling fin 87 acts to prevent the brake drum 86 or the components inside the casing 81 from overheating, thus allowing the grease inside the casing 81 to perform stably for a long time and preventing the brake from seizing during long descents.

The operation of dynamo 30 will now be described. When the spokes 99 rotate in relation to the front wheel fork 98 of a traveling bicycle 101, the outside rotor, which is fixed to first tubular member 11, rotates relative to the inside stator. The permanent magnet 37 rotates in the process, passing around the outside the claws of the stator yokes 31 and 32. The individual claws of the stator yokes 31 and 32 are thereby affected such that when one claw receives an N-pole magnetic flux from the permanent magnet 37, another claw receives an S-pole magnetic flux, and when one claw receives an S-pole magnetic flux from the permanent magnet 37, another claw receives an N-pole magnetic flux. In other words, rotating the permanent magnet 37 and making it pass around the individual claws of the stator yokes 31 and 32 create two repeating states: a first state in which the stator yoke 31 is an N-pole and the stator yoke 32 is an S-pole, and a second state in which the stator yoke 31 is an S-pole and the stator yoke 32 is an N-pole. An alternating magnetic flux is thus generated in the direction of the O-O axis in the tubular core yoke 35 magnetically linking the two yokes 31 and 32 with each other, thus inducing current in the coil 33.

The operation of the roller brake 80 and the brake modulator 40 in the front hub 1 will now be described. The rocking member 82 of the roller brake 80 is pivoted when the rider pulls on the inner cable of the brake wire 109 by actuating the brake. This causes the annular cam 83 to rotate and the rollers 84 to move radially outwardly. As this happens, the brake shoes 85 are pushed outwardly and press against the brake drum 86. The rotation of the brake drum 86 is thereby impeded.

The rotation damping force (braking force) exerted by the brake drum 86 is transmitted via the serrated portions 41d to the annular cup 41 and to the brake modulator 40. When the rotation of the annular cup 41 is damped, the damped rotation is transmitted via the brake-side friction plates 42 and the hub-side friction plates 43 to the second tubular member 12. When this happens, a rotation damping force also acts on the first tubular member 11, and braking is applied to the rotation of the front wheel 106 fixed to the hub flanges 11a and 12a with the aid of the spokes 99.

When the rider performs hard emergency braking, the brake shoes 85 and the brake drum 86 are brought with considerable force against each other, and the rotation damping force exerted by the brake drum 86 on the annular cup 41 reaches a maximum. When, however, excessive rotation damping force is applied to the annular cup 41, the brake-side friction plates 42 and the hub-side friction plates 43 slip in relation to each other, and the rotation damping force is transmitted to the second tubular member 12 in partially absorbed form. Consequently, the rotation damping force applied to the front wheel 106 is prevented from reaching the level at which the front wheel 106 is locked, and the front wheel 106 is prevented from skidding on the road surface.

As noted previously, a conventional bicycle hub is configured such that a dynamo or a brake modulator is disposed inside a tubular hub shell (outer shell) provided with a pair of hub flanges at the two ends thereof, so mounting either of these makes it impossible to mount the other. By contrast, the front hub 1 of the present embodiment is configured such that the tubular member 11 or 12 containing a dynamo 30 or a brake modulator 40 is attached with the aid of a single hub flange 11a or 12a to the spokes 99 whose inner ends are disposed on the left or right. It is therefore possible to provide a single bicycle wheel (front wheel 106) attached to a single type of wheel spoke with both the dynamo 30 and the brake modulator 40.

In the front hub 1 of the present embodiment, the first tubular member 11 is made of aluminum alloy die cast Type 5 (ADC5), and the second tubular member 12 is forged from an aluminum alloy. In addition, the second tubular member 12 alone is heat-treated, and the hardness of the second tubular member 12 is set to HRB 55 or greater. In other words, the second tubular member 12 is harder than the first tubular member 11. Such an approach reduces the cost of the first tubular member 11 and results in a minimal cost increase for the second tubular member 12, which is provided with the serrations 12d for transmitting rotation damping force from the roller brake 80 via the brake modulator 40. Total manufacturing costs can thus be reduced by dividing the outer shell of the front hub 1 into a first tubular member 11 located closer to the dynamo 30, and a second tubular member 12 located closer to the brake modulator 40, and selecting materials with matching characteristics for the two members.

In this arrangement, the seemingly obvious condition that the two tubular members constituting the outer shell need to be made of common materials is abandoned. Instead, different materials are selected for the first and second tubular members, thus making it possible to reduce the cost of the first tubular member while constructing the second tubular member (which needs to have comparatively high hardness or strength in order to be able to transmit the rotation damping force from the brake to the bicycle wheel) from a material that meets the necessary requirements.

More specifically, in this arrangement the rotation damping force exerted by the brake on the bicycle wheel is transmitted from the brake-side member to the second tubular member via the first and second frictional members. For this reason, the second tubular member must have sufficient hardness to mesh with the second frictional member and to transmit the rotation damping force. The first tubular member, on the other hand, is primarily designed for accommodating power generation members and does not need to be as hard as the second tubular member, which transmits the rotation damping force from the brake by means of meshing. In view of this, the second tubular member is allowed to fulfill its function and the first tubular member is made less expensive as a result of the fact that the hardness of the material for the second tubular member is set above the hardness of the material for the first tubular member in accordance with the present invention.

Additionally, in this arrangement the seemingly obvious condition that the two tubular members constituting the outer shell need to have matching diameters is abandoned. Instead, different diameters are selected for the first and second tubular members, thus making it possible to set the diameter of the first tubular member to a level suitable for housing the generator mechanism, and to set the diameter of the second tubular member to a level suitable for housing the brake force adjusting mechanism.

While the above is a description of various embodiments of the present invention, further modifications may be employed without departing from the spirit and scope of the present invention. For example, in the above embodiment, the present invention was adapted to a front hub 1 for supporting the front wheel 106, but the present invention is also applicable to a bicycle hub for supporting a rear wheel 107. The mating portion (portion corresponding to the serrations 41d) of the brake modulator 40 can be modified to allow various brakes (such as those defined in Japanese Industrial Standards (JIS) D-9414) for damping hub components to be mounted. Another option is to provide the hub with both a generating function and a brake force adjusting function, and to attach the hub to the front wheel fork 98 and spokes 99 of a bicycle wheel (front wheel 106) in the same manner as in the past. A meshing-type brake modulator can be adopted in addition to the frictional brake modulator 40 used in the above-described embodiment. Such a meshing-type brake modulator comprises a meshing-type clutch and a spring designed to engage and urge the clutch and to set the torque when the clutch is disengaged.

The size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A bicycle hub comprising:
   a hub axle;
   a hub shell including:
      a first tubular member having a first hub flange secured thereto; and
      a separate second tubular member having a second hub flange secured thereto;
   bearings disposed between the hub shell and the hub axle for rotatably supporting the first tubular member and the second tubular member relative to the hub axle;

a generator mechanism housed in the first tubular member and adapted to generate electricity by rotation of the first tubular member relative to the hub axle;

a brake force adjusting mechanism housed in the second tubular member and adapted to limit a maximum damping force of a brake, wherein the brake force adjusting mechanism comprises:
　a brake force receiving member rotatably mounted relative to the hub axle for receiving a braking force from a brake mechanism; and
　a frictional coupler for forming a frictional link between the second tubular member and the brake force receiving member;
　wherein the frictional coupler prevents locking of the hub shell relative to the hub axle regardless of the force received by the brake force receiving member.

2. The bicycle hub according to claim 1 wherein the generator mechanism comprises:
　an inside stator retained to the hub axle; and
　an outside rotor that rotates in response to rotation of the first tubular member.

3. The bicycle hub according to claim 2 wherein a material forming the second tubular member is harder than a material forming the first tubular member, and wherein the frictional coupler comprises:
　a first frictional member nonrotatably coupled relative to the brake force receiving member; and
　a second frictional member nonrotatably coupled relative to the second tubular member and in a facing arrangement with the first frictional member.

4. The bicycle hub according to claim 3 wherein at least one of the first frictional member and the second frictional member is axially movable relative to its corresponding brake force receiving member and second tubular member; and wherein the frictional coupler further comprises a biasing mechanism for biasing the first frictional member and the second frictional member toward each other.

5. The bicycle hub according to claim 4 wherein the brake force receiving member includes a serrated portion for coupling the brake force receiving member to the brake mechanism.

6. The bicycle hub according to claim 4 further comprising the brake mechanism coupled to the brake force receiving member.

7. The bicycle hub according to claim 6 wherein the brake mechanism comprises a brake drum nonrotatably coupled to the brake force receiving member.

8. The bicycle hub according to claim 7 wherein the brake mechanism further comprises:
　a brake shoe disposed radially inwardly of the brake drum for frictionally contacting the brake drum;
　a cam rotatably mounted relative to the hub axle radially inwardly of the brake shoe; and
　a plurality of rollers disposed between a radially outer surface of the cam and a radially inner surface of the brake shoe for moving the brake shoe toward the brake drum in response to rotation of the cam.

9. The bicycle hub according to claim 4 wherein the bearings comprise:
　a first bearing for rotatably supporting the first tubular member relative to the hub axle; and
　a second bearing disposed between the brake force receiving member and the hub axle for rotatably supporting the second tubular member relative to the hub axle.

10. The bicycle hub according to claim 1 wherein the first tubular member has a different outer diameter than the second tubular member.

11. The bicycle hub according to claim 10 wherein the first tubular member at a location of the generator mechanism has a different outer diameter than the second tubular member at a location of the brake force adjusting mechanism.

12. The bicycle hub according to claim 1 wherein the first tubular member is formed from a material that is different from a material forming the second tubular member.

13. The bicycle hub according to claim 1 wherein the first tubular member terminates axially prior to the second hub flange.

14. The bicycle hub according to claim 1 wherein the second hub flange is secured to the second tubular member such that the second tubular member and the second hub flange may be removed as a unit.

15. The bicycle hub according to claim 1 wherein the frictional coupler is disposed in the second tubular member.

16. A bicycle hub comprising:
　a hub axle;
　a hub shell including:
　　a first tubular member having a first hub flange secured thereto;
　　a separate second tubular member having a second hub flange secured thereto;
　　wherein the second hub flange is secured to the second tubular member such that the second tubular member and the second hub flange may be removed as a unit from the first tubular member while the first hub flange remains secured to the first tubular member;
　　wherein the second tubular member is harder than the first tubular member; and
　　a brake coupling member adapted to couple the second tubular member to a brake device;
　bearings disposed between the hub shell and the hub axle for rotatably supporting the first tubular member and the second tubular member relative to the hub axle; and
　a generator mechanism housed in the first tubular member and adapted to generate electricity by rotation of the first tubular member relative to the hub axle.

17. The bicycle hub according to claim 16 further comprising a brake force adjusting mechanism housed in the second tubular member and adapted to limit a maximum damping force of a brake.

18. The bicycle hub according to claim 17 wherein the generator mechanism comprises:
　an inside stator retained to the hub axle; and
　an outside rotor that rotates in response to rotation of the first tubular member; and
　wherein the brake force adjusting mechanism comprises:
　　a brake force receiving member including the brake coupling member rotatably mounted relative to the hub axle for receiving a braking force from a brake mechanism; and
　　a frictional coupler for forming a frictional link between the second tubular member and the brake force receiving member.

19. The bicycle hub according to claim 18 wherein the frictional coupler comprises:
　a first frictional member nonrotatably coupled relative to the brake force receiving member; and
　a second frictional member nonrotatably coupled relative to the second tubular member and in a facing arrangement with the first frictional member.

20. The bicycle hub according to claim 19 wherein at least one of the first frictional member and the second frictional member is axially movable relative to the corresponding brake force receiving member and second tubular member; and wherein the frictional coupler further comprises a biasing mechanism for biasing the first frictional member and the second frictional member toward each other.

21. The bicycle hub according to claim 20 wherein the brake force receiving member includes a serrated portion for coupling the brake force receiving member to the brake mechanism.

22. The bicycle hub according to claim 20 further comprising the brake mechanism coupled to the brake force receiving member.

23. The bicycle hub according to claim 22 wherein the brake mechanism comprises a brake drum nonrotatably coupled to the brake force receiving member.

24. The bicycle hub according to claim 23 wherein the brake mechanism further comprises:
   a brake shoe disposed radially inwardly of the brake drum for frictionally contacting the brake drum;
   a cam rotatably mounted relative to the hub axle radially inwardly of the brake shoe; and
   a plurality of rollers disposed between a radially outer surface of the cam and a radially inner surface of the brake shoe for moving the brake shoe toward the brake drum in response to rotation of the cam.

25. The bicycle hub according to claim 20 wherein the bearings comprise:
   a first bearing for rotatably supporting the first tubular member relative to the hub axle; and
   a second bearing disposed between the brake force receiving member and the hub axle for rotatably supporting the second tubular member relative to the hub axle.

26. A bicycle hub comprising:
   a hub axle;
   a hub shell including:
      a first tubular member having a first hub flange secured thereto;
      a separated second tubular member having a second hub flange secured thereto;
      wherein the second tubular member is harder than the first tubular member; and
   a brake coupling member adapted to couple the second tubular member to a brake device;
   bearings disposed between the hub shell and hub axle for rotatably supporting the first tubular member and the second tubular member relative to the hub axle;
   a generator mechanism housed in the first tubular member and adapted to generate electricity by rotation of the first tubular member relative to the hub axle;
   a brake force adjusting mechanism housed in the second tubular member and adapted to limit a maximum damping force of a brake, wherein the brake force adjusting mechanism comprises:
      a brake force receiving member rotatably mounted relative to the hub axle for receiving a braking force from a brake mechanism; and
      a frictional coupler for forming a frictional link between the second tubular member and the brake force receiving member; and
      wherein the frictional coupler prevents locking of the hub shell relative to the hub axle regardless of the force applied to the brake force receiving member.

* * * * *